United States Patent [19]
Michalek

[11] Patent Number: 5,641,239
[45] Date of Patent: Jun. 24, 1997

[54] DEVICE FOR CONNECTING BEARING RINGS

[75] Inventor: Joachim Michalek, Schweinfurt, Germany

[73] Assignee: SKF GmbH, Schweinfurt, Germany

[21] Appl. No.: 425,795

[22] Filed: Apr. 20, 1995

[30] Foreign Application Priority Data

Apr. 21, 1994 [DE] Germany ............... 94 06 691.4

[51] Int. Cl.$^6$ ..................... F16B 2/22
[52] U.S. Cl. ............ 403/397; 403/387; 403/329; 384/499; 384/504; 384/506; 384/539
[58] Field of Search ............. 403/397, 387, 403/384, 326, 329, 338, 335, 336, 293, 294, 24; 384/501, 487, 499, 504, 505, 506, 539

[56] References Cited

U.S. PATENT DOCUMENTS

| | | | |
|---|---|---|---|
| 1,226,419 | 5/1917 | Turner | 403/294 X |
| 1,379,945 | 5/1921 | Teetsow | 384/504 |
| 1,908,474 | 5/1933 | Dewees | 384/501 |
| 2,075,280 | 3/1937 | Green | 384/504 |
| 2,467,604 | 4/1949 | Tinnerman et al. | 403/387 |
| 3,252,190 | 5/1966 | Holton et al. | 403/384 |
| 3,466,799 | 9/1969 | Stilson | 423/338 X |
| 3,986,754 | 10/1976 | Torrant | 384/504 |
| 4,783,182 | 11/1988 | Caron et al. | 384/539 X |
| 5,059,058 | 10/1991 | Charet et al. | 403/329 X |
| 5,096,310 | 3/1992 | Meining et al. | 384/539 |
| 5,121,998 | 6/1992 | Bhatia | 384/539 X |
| 5,470,165 | 11/1995 | Bissinger | 384/499 X |

FOREIGN PATENT DOCUMENTS 780445 7/1957 United Kingdom ............ 453/387

*Primary Examiner*—Harry C. Kim
*Attorney, Agent, or Firm*—Eugene E. Renz, Jr.

[57] ABSTRACT

The device for connecting bearing rings with ring-shaped grooves is machined into the peripheral surfaces. An essentially sleeve-shaped connecting element engages in these grooves, where flange-shaped retaining projections on the connecting element cooperate with conical clamping surfaces of the ring-shaped grooves, which are characterized by ring-shaped grooves formed in the ring-shaped undercut. These grooves have positive-locking surfaces oriented toward its interior and snap-lock elements are arranged in a ring on the retaining projections to grip behind the positive-locking surfaces.

5 Claims, 1 Drawing Sheet

DEVICE FOR CONNECTING BEARING RINGS

BACKGROUND OF THE INVENTION

Devices and systems for connecting bearing flags are not new per se. A typical prior art connecting element is shown in U.S. Pat. No. 1,908,474 which fits in the bores of two ball bearings to connect the same in abutting end to end fashion. The connecting element engages in grooves which are machined in the inner rings near the lateral surfaces. The flanks of the grooves are cortically inclined to function as clamping surfaces and are engageable by correspondingly tapered locking surfaces of the connecting element. The connecting element is in the form of a ring with a slot and engages elastically against the flanks of the grooves. By this arrangement, the bearings are joined together under pretension. Moreover, the conical clamping surfaces compensate for manufacturing errors within a certain tolerance range. A disadvantage or drawback of this design is that the effectiveness with which the two bearings are held together depends in large measure on the elastic tension of the connecting element. More specifically, it has been found that during removal of the assemblies, it is possible for the connection established by the conical clamping surfaces to separate or loosen. Additionally, a plurality of connecting elements are required for each size bearing.

SUMMARY OF THE INVENTION

With the foregoing in mind, it is an object of the present invention to provide a device for connecting bearing rings which overcomes the disadvantages and drawbacks of the prior art discussed above, and which is relatively inexpensive and performs a retaining function extremely reliably. To this end, circumferentially extending locking grooves or pockets are provided in a peripheral surface of an annular member, such as, a bearing ring spaced axially from one axial end face thereof. The groove has an undercut defined by an axially extending fib defining a circumferentially extending positive locking surface oriented towards the interior of the locking groove or pocket. The locking element is an elongated strip having axially spaced, radially outwardly directed retaining projections which engage in the locking grooves in the adjacent bearing tings, each outwardly directed projection having an oppositely directed flexible locking flange which snap past the confronting circumferentially extending ribs defining the locking surfaces to flex outwardly and engage and seat behind the locking surfaces to thereby connect the rings in abutting end to end relation. The snap-lock connecting device of the present invention provides a positive mounting arrangement which does not become loose unintentionally as with the prior art connecting devices discussed above. Furthermore, the snap-lock retainer of the present invention can be made inexpensively, fabricated from flexible strip plastic material. The present invention covers a wide range of bearing sizes simply by cutting the strips to appropriate lengths for a given bearing size.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
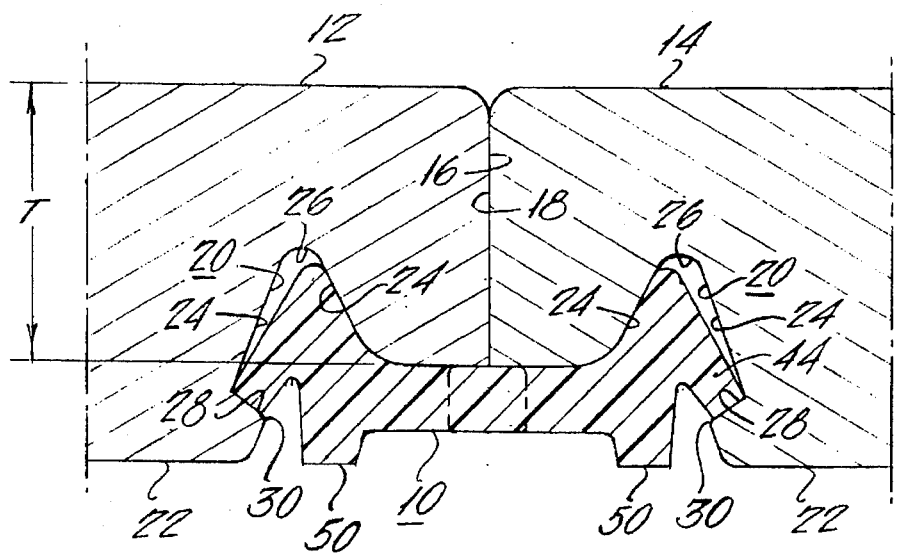
FIG. 1 is a fragmentary cross-sectional view of the present invention connecting two (2) bearing rings.

Referring now to the drawings and particularly to FIG. 1 thereof, there is illustrated a bearing retainer generally designated by the numeral 10 for holding annular members in abutting end to end relation. In the present instance, the annular members are in the form of inner bearing rings 12 and 14 which are supported so that their axial end faces 16 and 18 are in confronting and abutting end to end relation.

Ring-shaped grooves 20 are formed in each of the inner bearing tings, in the present instance extending inwardly from the inner bore surface 22. The grooves define two oppositely slanted flanks 24, which diverge downwardly and outwardly from the apex 26 of the grooves 20 and terminate in spaced circumferentially extending clamping or locking surfaces 28. Each groove is formed with an axially directed circumferential shoulder or rib 30 at the open lower end of the groove defining a seat for engagement by the retainer to provide positive locking surface.

The locking surfaces 28 defined by the ribs 30 are formed by undercuts during the production of the ring-shaped grooves 20. Further, the wall thickness T of the inner rings adjacent the axial end faces 16 and 18 is of reduced cross section to permit seating of the retainer in the manner shown in FIG. 1. The lower face of the projections 44 of the retainer has a pair of depending rails 50 at the opposite terminal ends thereof which depend to a point where they are circumferentially coplanar with the bore surface 22 of the inner rings to firmly seat against a shaft member or the like engaging in the bore of the bearing rings.

Figure 2:
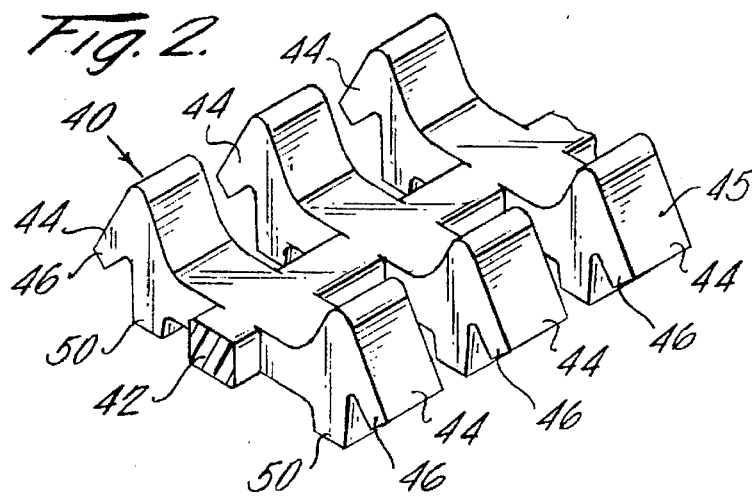
FIG. 2 is a fragmentary perspective view of the present invention showing a continuous segmented strip embodiment.

The retainer or connecting member which is best illustrated in FIG. 2 is generally designated by the numeral 40 and comprises an elongated strip made of a flexible plastic material. The strip 40 is adapted to be cut to appropriate lengths and formed into an annulus and in this manner, the strips can be cut to any desired length and accommodate a wide variety of bearing sizes. The connecting member 40 includes a body portion 42 of generally uniform cross section having axially spaced outwardly directed retaining projections, 44 which, as illustrated, are of generally inverted v-shaped cross section. The outer confronting faces 45 of the retainer are beveled and complement the taper of the locking grooves in the bearing rings to snugly embrace the same in the assembled relation as shown in FIG. 1. The projections include downwardly depending flexible flanges or lips 46, which provide snap-lock elements having a predetermined elasticity or flexibility in the axial direction, to snap through the opening defined by the ribs 30 and then which engage behind positive the locking surfaces 28 of the ring-shaped grooves 20 in the bearing rings.

Figure 3:
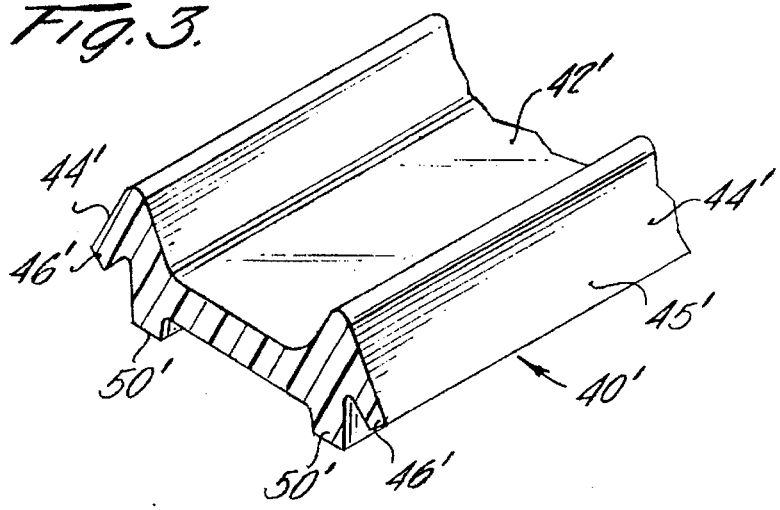
FIG. 3 is a fragmentary perspective view of a modified embodiment showing a continuous extruded strip.

There is shown in FIG. 3 a modified embodiment of the retainer in accordance with the present invention of generally the same cross section configuration as that described above and shown in FIG. 2, except that the retaining projection designated 44' is continuous and the depending rails 50 are likewise continuous.

Even though a particular embodiment of the present invention has been illustrated and described herein, it is not intended to limit the invention and changes and modifications may be made therein within the scope of the following claims. For example, the snap-lock elements or flexible flanges can be distributed individually around the periphery of the retaining element or can form a continuous flange.

Moreover, it is also possible for individual sections of the strip to be made of a cross section shown or with a similar cross section to be spaced around the circumference of the bearing.

What is claimed is:

1. A locking assembly comprising:

first and second annular members disposed side by side and having confronting axial end faces in abutting end to end relation, each of said first and second annular members having an inner peripheral surface with a circumferentially extending ring shaped groove formed thereon, said ring shaped grooves of the first and second annular members together defining a circumferentially extending continuous pocket having a constricted opening leading into a wider recessed area with locking surfaces; and a locking element disposed within said pocket for engaging the locking surfaces to connect said first and second annular members together and to prevent radial displacement of the locking element from said pocket, said locking element being in the form of a ring having flexible retaining projections thereon, said flexible retaining projections being adapted to flex inwardly for passing through said constricted opening of said pocket and to allow said locking element to be completely nested in the pocket and flushed with said inner peripheral surfaces of the first and second annular members.

2. The locking assembly of claim 1, wherein the locking element includes a pair of depending feet which are flushed with the inner peripheral surfaces of the annular members.

3. The locking assembly of claim 1, wherein said each ring shaped groove includes a v-shaped portion defined by two oppositely slanted flanks diverging downwardly and outwardly from an apex of the v-shaped portion and spaced inwardly from the confronting axial end face of the respective annular member and wherein the locking element includes a pair of spaced retainer sections shaped to complement the v-shaped portions of the ring shaped grooves to snugly embrace the grooves in the assembled relation and to act as a force biasing the confronting axial end faces of the first and second annular members toward one another when fully seated in the grooves.

4. The locking assembly of claim 1, wherein the locking element comprises a central body portion and locking retainer sections and wherein the retaining projections and the locking retainer sections are formed as a plurality of discrete separate elements projecting from opposite sides of the body portion.

5. The locking assembly of claim 1, wherein the locking element comprises a central body portion and wherein the central body portion and the retaining projections are formed integrally and are continuous for the length of the locking element.

* * * * *